J. THOMPSON.
Cross-Cut Sawing-Machines.

No. 155,902. Patented Oct. 13, 1874.

WITNESSES:

INVENTOR:
J. Thompson
BY
ATTORNEYS.

UNITED STATES PATENT OFFICE.

JEFFERSON THOMPSON, OF MEXICO, INDIANA.

IMPROVEMENT IN CROSSCUT-SAWING MACHINES.

Specification forming part of Letters Patent No. 155,902, dated October 13, 1874; application filed July 3, 1874.

*To all whom it may concern:*

Be it known that I, JEFFERSON THOMPSON, of Mexico, in the county of Miami and State of Indiana, have invented a new and useful Improvement in Crosscut-Sawing Machines, of which the following is a specification:

The invention will first be fully described, and then pointed out in the claim.

Figure 1:
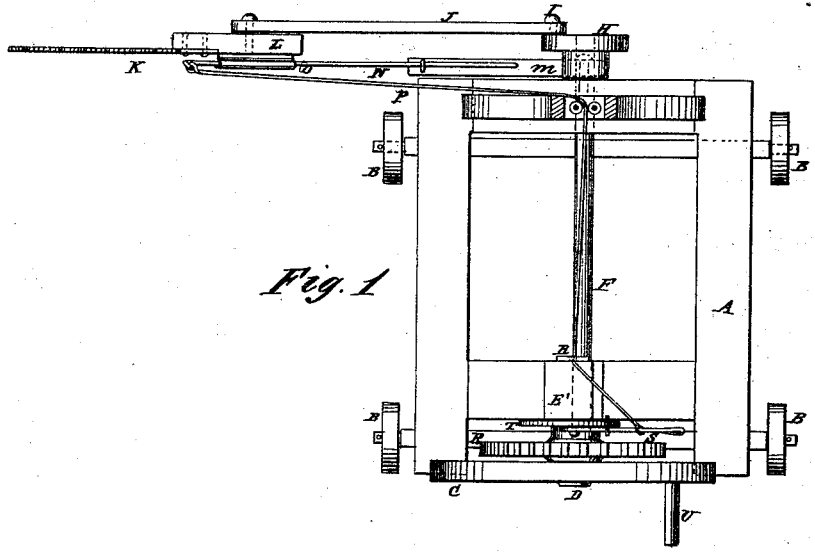
Figure 2:
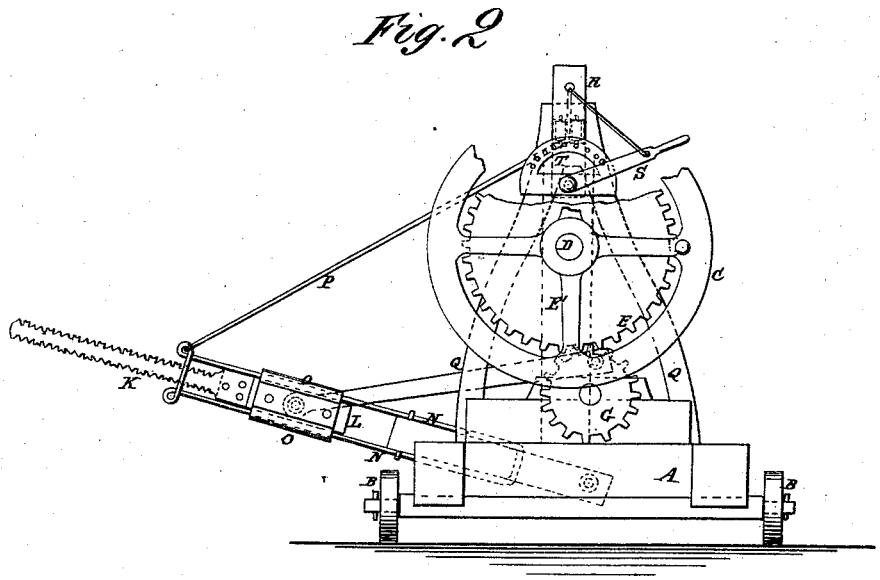

In the accompanying drawing, Figure 1 is a top or plan view. Fig. 2 is an end elevation, with a portion of the fly-wheel broken away to show the adjusting mechanism of the saw.

Similar letters of reference indicate corresponding parts.

A is a frame, mounted on truck-wheels B, by means of which the machine may be transported from place to place, or is rendered portable. The operating parts of the machine are attached to this frame. C is the fly-wheel. D is a short shaft, to which the wheel C and driving cog-wheel E are attached. This shaft passes through a central stand, E'. (Seen in dotted lines in Fig. 2.) F is a horizontal shaft, raised a little above the frame A, upon one end of which is a pinion-wheel, G, with which the driving-wheel E engages. On the other end is the flanged disk H, to which the wrist I of the pitman J is attached, which gives the saw a reciprocating motion. K represents the saw, both edges of which are provided with teeth, so that it may be reversed when desired. The saw is rigidly attached to the block L, and the forward end of the pitman is pivoted to this block. m is a block, which is pivoted to the front of the frame A. Attached to this block m are the ways or guides N N, which project forward, as seen in the drawing, and receive the clasps or slides O O of the saw-block L. The saw is, therefore, supported on these guides or ways as it is moved back and forth by the pitman, the clasps serving as slides on the ways.

By revolving the horizontal shaft F the saw receives a reciprocating motion when it is laid on a log or timber, and the block m, being pivoted to the frame, allows the saw and the parts connected therewith to work down as the saw cuts through the timber.

P is a cord attached to the forward end of the ways N. This cord extends from the ways upward, and passes between pulleys in the upper end of a stand, consisting of the two inclined posts Q Q, (see Fig. 2,) which stand on the frame A over the forward bearing of the horizontal shaft F. From this stand the cord extends through the plate R, which is adjustably attached to the back post or stand E', and from thence to the adjustable arm S, which is pivoted to the back or opposite side of the stand E'. T is a circular plate, provided with a series of holes. The arm S is adjusted on this plate, so as to arrest the downward movement of the saw at any desired point by means of a pin through the plate. The saw is also lifted up and supported by the cord when it is not in operation.

This machine may be driven by hand or by other motive power.

U is a crank-handle in the side of the balance-wheel C for operating the saw by hand.

This machine is used for sawing logs or timber and wood for fuel. It may be taken to the forest, and moved from place to place, as may be found necessary.

Having thus described my invention, I claim as new and desire to secure by Letters Patent—

The combination, with frame A and pivoted saw-frame N, of the cord P, plate R, arm S, and the plate T, perforated at several points and fastened by a pin, all substantially as and for the purpose described.

JEFFERSON THOMPSON.

Witnesses:
 DANL. GRISWOLD,
 WILLIAM P. IRELAND,
 AMOS FORTNEY.